(12) United States Patent
Sarikaya (10) Patent No.: US 8,798,028 B2
(45) Date of Patent: Aug. 5, 2014

(54) SYSTEM, APPARATUS, AND METHOD FOR DISTRIBUTED HOME AGENTS IN A MOBILE IP ENVIRONMENT

(75) Inventor: Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 71 days.

(21) Appl. No.: 13/470,862

(22) Filed: May 14, 2012

(65) Prior Publication Data

US 2012/0294189 A1 Nov. 22, 2012

Related U.S. Application Data

(60) Provisional application No. 61/486,537, filed on May 16, 2011.

(51) Int. Cl.
*H04J 3/24* (2006.01)
(52) U.S. Cl.
USPC .......................................................... 370/349
(58) Field of Classification Search
USPC ......... 370/331, 338, 270, 254, 312, 313, 349, 370/389, 383, 392, 432, 475; 455/432.1, 455/435.1; 709/207; 713/155
See application file for complete search history.

(56) References Cited

U.S. PATENT DOCUMENTS

| | | | | |
|---|---|---|---|---|
| 7,116,654 | B2 * | 10/2006 | Kim | 370/338 |
| 2004/0100951 | A1 * | 5/2004 | O'neill | 370/389 |
| 2004/0111483 | A1 * | 6/2004 | Watanabe | 709/207 |
| 2006/0025130 | A1 * | 2/2006 | Krishnamurthi et al. | 455/432.1 |
| 2008/0084847 | A1 * | 4/2008 | Xia et al. | 370/331 |
| 2008/0285518 | A1 | 11/2008 | Dutta et al. | |
| 2009/0052425 | A1 | 2/2009 | Aso et al. | |
| 2009/0124256 | A1 * | 5/2009 | Hirano | 455/435.1 |
| 2012/0297186 | A1 * | 11/2012 | Weniger et al. | 713/155 |

FOREIGN PATENT DOCUMENTS

| | | |
|---|---|---|
| CN | 101060692 A | 10/2007 |
| CN | 101340338 A | 1/2009 |
| CN | 101438546 A | 5/2009 |
| WO | 2008140634 A1 | 11/2008 |

OTHER PUBLICATIONS

Foreign Communication From a Counterpart Application, PCT Application No. PCT/CN2012/075563, International Search Report dated Sep. 13, 2012, 3 pages.

(Continued)

*Primary Examiner* — Obaidul Huq
*Assistant Examiner* — Syed M Bokhari
(74) *Attorney, Agent, or Firm* — Conley Rose, P.C.; Grant Rodolph; Brandt D. Howell (57) ABSTRACT

Included is an apparatus comprising a first network node in a first network configured to act as a home agent (HA) for a mobile node (MN), wherein the first network is one of a plurality of networks that connect to the MN, and wherein a second network that connects to the MN comprises a second network node configured to act as a second HA for the MN. Also included is a method comprising receiving, by a first network node, a binding update message, wherein the first network node is in a first network, and wherein the first network node is configured to act as a HA for a MN; and sending, by the first network node, a binding acknowledgement, wherein the binding update message comprises a multicast state of the MN.

19 Claims, 8 Drawing Sheets

(56) References Cited

OTHER PUBLICATIONS

Foreign Communication From a Counterpart Application, PCT Application No. PCT/CN2012/075563, Written Opinion dated Sep. 13, 2012, 8 pages.
Sarikaya, B., "Distributed Mobility Management Protocol with Multicast Support," Network Working Group, Internet Draft, draft-sarikaya-mext-multicastdmm-00.txt, May 12, 2011, 29 pages.
Johnson, et al., "Mobility Support in IPv6", RFC 3775, Jun. 2004, 155 pages.
Sarikaya, B., "Distributed Mobility Management Protocol with Multicast Support," draft-sarikaya-mext-multicastdmm-04.txt, Oct. 26, 2011, 17 pages.
Bradner, "Key Words for Use in RFCs to Indicate Requirement Levels," RFC 2119, Mar. 1997, 3 pages.
Vixie, Ed., et al., "Dynamic Updates in the Domain Name System (DNS Update)," RFC 2136, Apr. 1997, 27 pages.
Perkins, Ed., et al., "Mobility Support in IPv6," RFC 6275, Jul. 2011, 170 pages.
Giaretta, Ed., et al., "Mobile IPv6 Bootstrapping in Split Scenario," RFC 5026, Oct. 2007, 29 pages.
Soliman, Ed., "Mobile IPv6 Support for Dual Stack Hosts and Routers," RFC 5555, Jun. 2009, 42 pages.
Wakikawa, Ed., et al., "Multiple Care-of Addresses Registration," RFC 5648, Oct. 2009, 37 pages.
Tsirtsis, et al., "Flow Bindings in Mobile IPv6 and Network Mobility (NEMO) Basic Support," RFC 6089, Jan. 2011, 32 pages.
Jang, et al., "DHCP Options for Home Information Discovery in MIPv6," draft-ietf-mip6-hiopt-17.txt, May 22, 2008, 24 pages.
Xia, et al, "DHCPv4 Options for Home Information Discovery in Dual Stack MIPv6," draft-xia-mext-hioptv4-03.txt, Jul. 11, 2011, 11 pages.
Vida, Ed., et al., "Multicast Listener Discovery Version 2 (MLDv2) for IPv6," RFC 3810, Jun. 2004, 58 pages.
Cain, et al, "Internet Group Management Protocol, Version 3," RFC 3376, Oct. 2002, 53 pages.
Arkko, et al., "Extensible Authentication Protocol Method for 3rd Generation Authentication and Key Agreement (EAP-AKA)," RFC 4187, Jan. 2006, 80 pages.
Devarapalli, et al., "Mobile IPv6 Operation with IKEv2 and the Revised IPsec Architecture," RFC 4877, Apr. 2007, 27 pages.
Liu, Ed., "Distributed Deployment of Mobile IPv6," draft-liu-mext-distributed-mobile-ip-00.txt, Mar. 7, 2011, 13 pages.
Yokota, et al., "Use Case Scenarios for Distributed Mobility Management," draft-yokota-dmm-scenario-00.txt, Oct. 18, 2010, 19 pages.
Perkins, "Altenate Tunnel Source Address for Home Agent," draft-perkins-mext-hatunaddr-01.txt, Aug. 3, 2011, 11 pages.

* cited by examiner

SYSTEM, APPARATUS, AND METHOD FOR DISTRIBUTED HOME AGENTS IN A MOBILE IP ENVIRONMENT

CROSS-REFERENCE TO RELATED APPLICATIONS

The present application claims priority to U.S. Provisional Patent Application 61/486,537, filed May 16, 2011 by Behcet Sarikaya, et al. and entitled "Distributed Mobility Management Protocol with Multicast Support," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern wireless communication systems, a mobile device, often referred to as a mobile node (MN), may wirelessly transmit data to and from one or more entities, often referred to as correspondent nodes (CNs). One of the problems with managing such wireless data transmission is that the MN may physically move from one location to another, which may require a handover from the MNs home network to one or potentially several other networks. Mobile Internet Protocol (IP) standards have been developed to allow a MN to move from one network to another while retaining a consistent IP address. Mobile IP version six (IPv6) and Mobile IP version four (IPv4), as defined in Internet Engineering Task Force (IETF) documents Request For Comment (RFC) 6275 and RFC 5944, which are incorporated herein by reference, are example Mobile IP standards.

These standards require a network device in the MN's home network to act as a home agent (HA) for all communications (i.e centralized mobility anchoring). When the MN is connected to a foreign network, the MN may send a Care of Address (CoA) to the HA. A CN may send data to the HA to be rerouted to the MN at the CoA. The MN may send data to the CN, typically by routing the data through the HA. As a result, the data flows are routed through the MNs home network, even if more optimal paths are available.

SUMMARY

In one embodiment, the disclosure includes an apparatus comprising a first network node in a first network configured to act as a HA for a MN, wherein the first network is one of a plurality of networks that connect to the MN, and wherein a second network that connects to the MN comprises a second network node configured to act as a second HA for the MN.

In another embodiment, the disclosure includes a method comprising receiving, by a first network node, a binding update message, wherein the first network node is in a first network, and wherein the first network node is configured to act as a HA for a MN; and sending, by the first network node, a binding acknowledgement, wherein the binding update message comprises a multicast state of the MN.

In yet another embodiment, the disclosure includes a network comprising a control plane HA configured to manage data flow binding registrations for a MN through a first network; and a data plane HA configured to transmit data plane packets to the MN, wherein the MN is configured to connect to a HA in a second network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method to allow a MN to operate through a plurality of HAs (e.g. distributed HAs) as discussed in IETF document draft-sarikaya-mext-multicast-dmm-04 by Behcet Sarikaya, which is incorporated by reference as if reproduced herein. When a MN connects to a foreign network (e.g. an access network) a network node, such as an access router, may act as a HA for all new communications and may send data directly to and receive data directly from a CN without routing the data though the MNs home network. Once a first HA begins managing a communication, the first HA may continue to manage that communication until such communication is terminated. When the MN moves to a second network with a second HA, the second HA may forward ongoing communications to the first HA via network tunneling, while natively routing all new communications along more optimal paths. The MN may store the address of the home network HA, the current HA, and all HAs that are managing an ongoing communication in a HA cache. When the MN moves from one network to another, the MN may send a binding update, comprising the MNs current CoA, to each HA in the HA cache. The binding update may also comprise a multicast option that may comprise the current multicast state of MN. A HA may be removed from the MN's HA cache upon termination of the relevant communication(s) and/or upon a timeout. Multi-interface communications may be supported by assigning a unique CoA to each interface, which may allow flow mobility between interfaces. In an embodiment, the control plane may be separated from the data plane by employing a control plane HA and a data plane HA in each network. The control plane HA and the data plane HA may share a database. The control plane HA and the data plane HA may be implemented on different nodes. IPv4 functionality may be supported by employing dual stack HAs.

Figure 1:
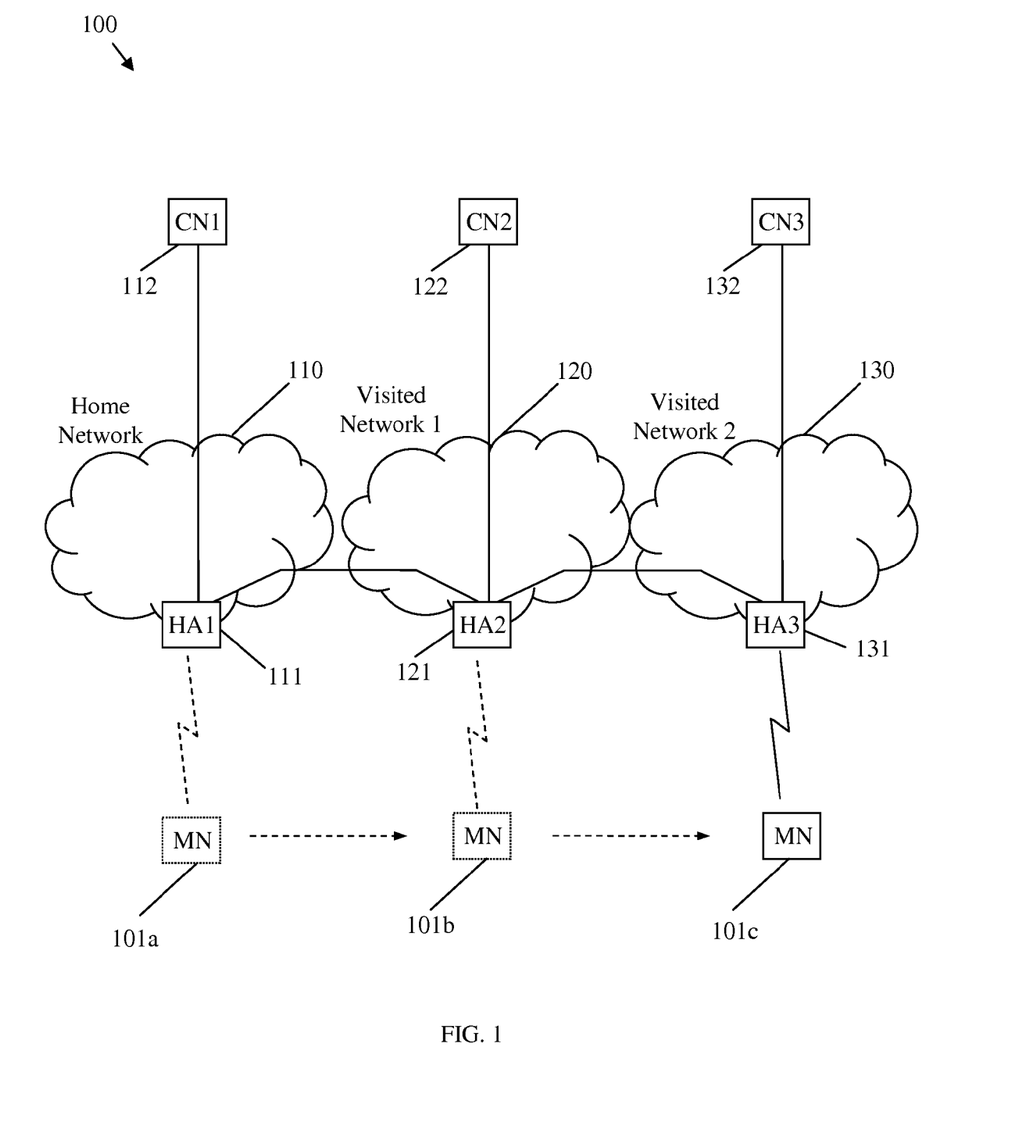
FIG. 1 is a schematic diagram of an embodiment of telecommunications system with multiple home agents.

FIG. 1 is a schematic diagram of an embodiment of telecommunications system 100 with multiple home agents. The system comprises a MN 101, which may be connected to a home network 110, a first visited network 120, and a second visited network 130 at different points in time. The MN 101 may connect to the networks through a first network node 111, a second network node 121, and a third network node 131 depending on which network the MN 101 is currently connected to. The networks 110, 120, and 130 may be interconnected, and may forward communications to and from the MN, if the MN is connected to that network, or to and from the network the MN is connected to at a given time. Each network node may comprise and/or be part of a HA. The MN 101 may establish communications with a first CN 112, a second CN 122, and a third CN 132 at different times. The MN 101 may maintain some or all of those communications as the MN 101 moves from network to network. When a network node establishes a communication with a CN through a HA, that HA may continue to manage the communication until the communication terminates. A new communication may be managed by whichever HA the MN happens to be connected to when the communication is initiated.

A MN 101 may be any wireless device capable of wireless data communication, such as a mobile phone, a personal digital assistant (PDA), a portable computer, or any other wireless device. The MN may connect to the telecommunications system 100 using multiple protocols such as mobile IPv6, mobile IPv4, and/or similar protocols. The mobile node 101 may move from one network to another. MN 101a illustrates the MN 101a being connected to a first network 110 at time a, MN 101b illustrates the MN 101b being connected to a second network 120 at time b, and MN 101c illustrates the MN 101c being connected to a third network 130 at time c.

The mobile node may be associated with a home network 110. A home network 110 may be a network that is in direct wireless communication with the MN 101 and/or that assigns the MN an identifying address, such as an IP address. A home network 110 may be a broadband wireless metropolitan area network (MAN) based on IEEE 802.16 standard (also referred as a Worldwide Interoperability for Microwave Access (WiMAX) network) which is incorporated by reference, a long term evolution (LTE) network such as a fourth generation (4G) network for Global System for Mobile communications (GSM) or Third Generation Partnership Project (3GPP) network, a wireless local area network (WLAN) based on the Institute of Electrical and Electronics Engineers (IEEE) standard 802.11 which is incorporated by reference, also referred to as a WiFi network, a local area network, or a similar wireless data transmission network. The home network 110 may be an access network, and may not be part of a core network. For clarity of discussion, the home network 110 may also be referred to as the first network 110. However, one skilled in the art will understand that the terms first network, second network, and/or third network may refer to networks 110, 120, or 130 regardless of any particular order depending on the embodiment. The MN 101 may be in communication with a first CN 112 through the first network 110. CN 112 may be any host or peer capable of maintaining a data communication with the MN 101. CN 112 may be mobile or stationary.

The home network 110 may comprise a first network node 111. The first network node 111 may be an access router or similar device, and may comprise a first HA 111. The first HA 111 may assign an IP or similar address to the MN 101. The first HA 111 may also maintain a current CoA of the MN 101 when the MN 101 leaves the home network. The first HA 111 may maintain one or more bindings on behalf of the MN 101 for any active communication to or from the MN 101 that passes through the first network 110, such as a communication between MN 101 and the first CN 112. A binding may be an association of the MN's 101 address with the MN's 101 CoA. When the first HA 111 is a HA in the home network, the first HA 111 may maintain the CoA of the MN 101 regardless of MN's 101 active communication status. The CN 112 may send communications to MN 101 via the first HA 111, allowing the first HA 111 to redirect the communications using the MN's 101 current CoA. Alternatively, the first CN 112 may send such communications directly to the MN 101 in the MN's 101 current location using reverse network tunneling in response to a data packet received from MN 101. The CN's 112 use of reverse tunneling may alleviate the need for the CN 112 to perform route optimization.

At time b, the MN 101b may connect to a first visited network 120, which may be referred to as the second network 120. The second network 120 may be substantially similar to the first network 110, except the second network may be a foreign network to the MN 101, and thus may not be a home network for the MN 101. Upon moving to the second network 120, the MN may connect to a second node 121 comprising a second HA 121. The second HA 121 may be substantially similar to the first HA 111, except the second HA may not be the home HA for the MN 101. At time b, the MN 101b may initiate a communication with a second CN 122 while attached to the second network 120. The second CN 122 may be substantially similar to the first CN 112. The second HA 121 may maintain a binding for MN 101b associated with the communication with the second CN 112 until such communication terminates. The second HA 121 may natively route all such communications to the second CN 122 in the most efficient manner possible and may bypass the first network 110. The MN 101b may also maintain the communication with the first CN 112. The HA 121 may forward all ongoing communications to the first CN 112 via the first HA 111 using network tunneling.

At time c, the MN 101c may connect to a second visited network 130, which may be referred to as the third network 130. The third network 130 may be substantially similar to the second network 120. Upon moving to the third network 130, the MN may connect to a third node 131 comprising a third HA 131. The third HA 131 may be substantially similar to the second HA 121. At time c, the MN 101c may initiate a communication with a third CN 132 while attached to the third network 130. The third CN 132 may be substantially similar to the second CN 122. The third HA 131 may maintain a binding for MN 101c associated with the communication with the third CN 132 until such communication terminates. The third HA 131 may natively route all such communications to the third CN 132 in the most efficient manner possible and may bypass the first network 110 and the second network 120. The MN 101c may maintain the communication with the first CN 112. The HA 131 may forward all ongoing communications to the first CN 112 via the first HA 111 using network tunneling. The MN 101c may also maintain the communication with the second CN 122. The HA 131 may forward all ongoing communications to the second CN 122 via the second HA 121 using network tunneling. HAs 111, 121, and 131 may be equipped with dual stack capabilities and may support IPv4 communications. A HA may be a node in a first network, such as a router, that manages local communications for a MN in the first network, maintains the location (e.g. CoA) of the MN when that MN is no longer connected to the first network, and forwards packets to and from the MN in its current location, which may be in a second network at a later time. As such, depending on the embodiment, a node in a first network may not be required to perform all of the functions of a HA (e.g. maintaining a CoA in a foreign network) as long as the MN is connected to the first network.

Figure 2:
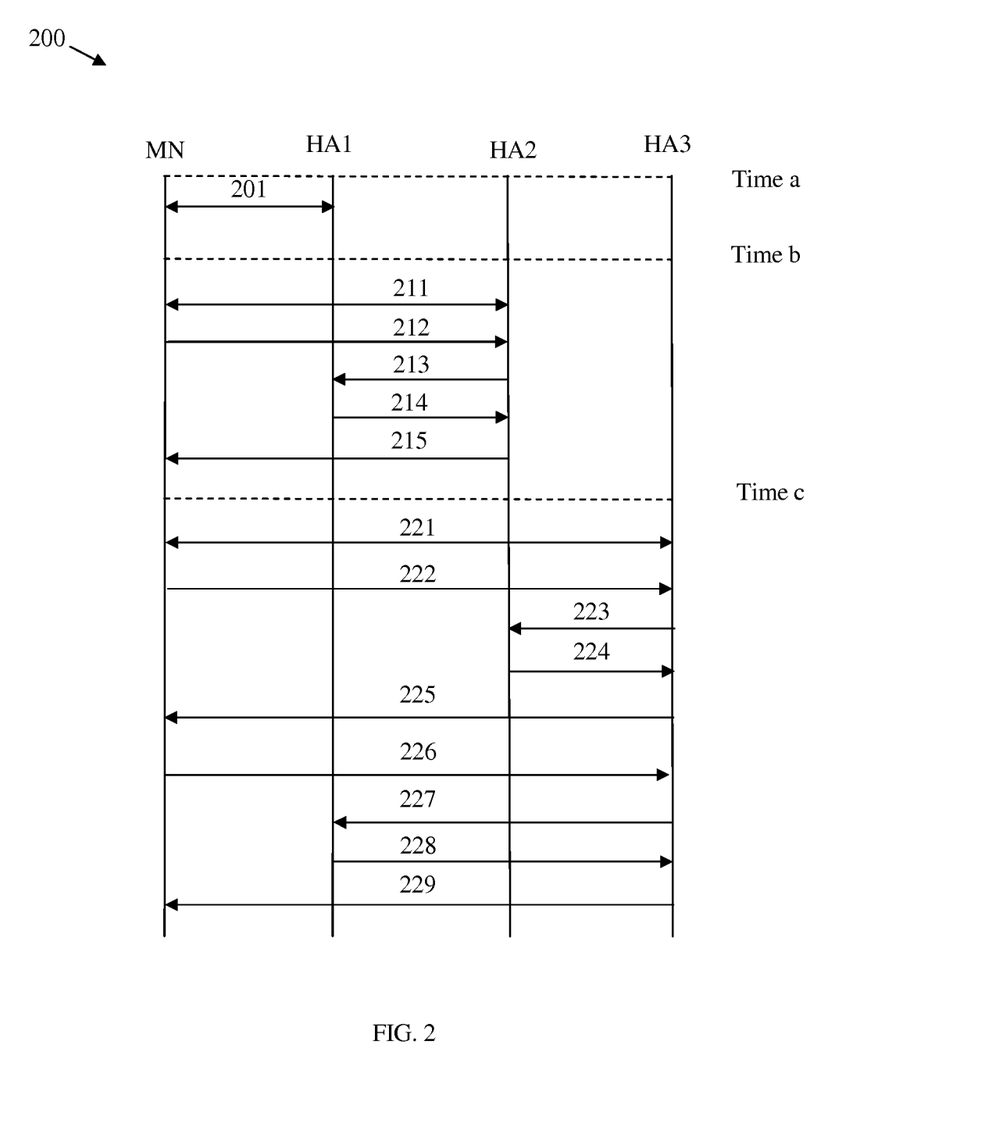
FIG. 2 is a protocol diagram of an embodiment of a multi-home agent binding update method.

FIG. 2 is a protocol diagram of an embodiment of a multi-HA binding update method 200. The binding update method 200 may be used in conjunction with telecommunications system 100 shown in FIG. 1 to achieve the communication routing patterns discussed above. At time a, a MN may attach 201 to a first network and a first HA using any method commonly known in the industry. Such attachment method may depend on the nature of the first HA and/or the nature of the first network in which the first HA is located. For example, the MN may request a connection, the HA may send a router advertisement with the HA's address (e.g. via a HA Information Option), the HA and MN may negotiate a connection, and the HA may assign an IP address to the MN. The MN may use bootstrapping to obtain HA's address if the address is not included in the router advertisement. The MN may use Extensible Authentication Protocol (EAP), Internet Key Exchange (IKE), IKE version 2 (IKEv2) and/or Authentication and Key Agreement (AKA) authentication to create any necessary security associations (SAs) with the HA. If the first network is not the MNs home network, the first network may assign a CoA to the MN. The MN may then register the MN's IP address with a domain name system (DNS) via the first HA. The MN may initiate any communications to a first CN through the first HA.

Later, at time b, the MN may attach 211 to a second HA in a second network. Such attachment 211 may be accomplished in manner substantially similar to 201. The second HA may make changes to the DNS on behalf of the MN. If the second network is not the MNs home network, the second network may assign a CoA to the MN, which is used as the MNs new home address. If a communication with the first CN is ongoing, the MN may send a binding update 212 to the first HA via the second HA. The second HA may forward 213 the binding update 212 to the first HA. The contents of, and the process of sending, a binding update are set forth in RFC 6275 and/or RFC 5944. The MN may also remove DNS entries comprising the MN's old home addresses that are no longer used (e.g. via the binding update sent to the first HA). The MN may send a binding update 212 to the MN's home network HA regardless of whether ongoing communication is occurring through the home network. The binding update 212 may comprise the MNs current CoA and the multicast state of the MN comprising data regarding all of the ongoing multicast group subscriptions associated with any ongoing communications. Such multicast state data may be obtained when initiating each new communication. The binding update 212 may be used to keep any tunnels between the MN and the first HA active. The first HA may then send a binding acknowledgement 214 indicating to the MN that the MN's CoA has been bound to the MN's IP address for purposes of the ongoing communications. The binding acknowledgement 214 may be received by the second HA and forwarded 215 to the MN. The contents of, and the process of sending, a binding acknowledgement are set forth in RFC 6275 and/or RFC 5944. Establishing a new CoA for the MN may require SA reauthentication with the first HA. The first HA may begin transmitting all data packets from the first CN through a tunnel between the first HA and the MN. The MN may send responsive communications to the first CN using reverse tunneling. The MN may also begin communicating with a second CN through the second HA. The MN may not establish a binding with the second HA until the MN moves to a new network and determines a communication through the second HA is still active.

Later, at time c, the MN may attach 221 to a third HA in a third network. Such attachment 221 may be accomplished in manner substantially similar to 201. The third HA may assign a CoA and make changes to the DNS as discussed above. If communications are ongoing with the first CN, the MN may send a binding update 222 to the first HA via the third HA in a manner substantially similar to 212. The third HA may then forward 223 the binding update to the first HA. The first HA may send a binding acknowledgement 224 to the MN via the third HA in a manner substantially similar to 214. The third HA may then forward 225 the binding acknowledgement 224 to the MN. If communications are ongoing with the second CN, the MN may send a binding update 226 to the second HA via the third HA in a manner substantially similar to 212. The third HA may forward 227 the binding update 226 to the second HA. The second HA may send a binding acknowledgement 228 to the MN via the third HA in a manner substantially similar to 214. The third HA may then forward 229 the binding acknowledgement 228 to the MN. Tunneling between the first HA and the MN and the second HA and the MN may be accomplished in a substantially similar manner to the tunneling between the MN and the first HA discussed above. The MN may also initiate communications with a third CN through the third HA. The MN may discontinue sending binding updates to and receiving binding acknowledgements from a HA when communications managed by that HA have been discontinued or have timed out. The MN may continue to send binding updates to the HA in the MN's home network regardless of communication status. The binding update and acknowledgement process 222-225 may occur contemporaneously or sequentially with the binding update and acknowledgement process 226-229.

Figure 3:
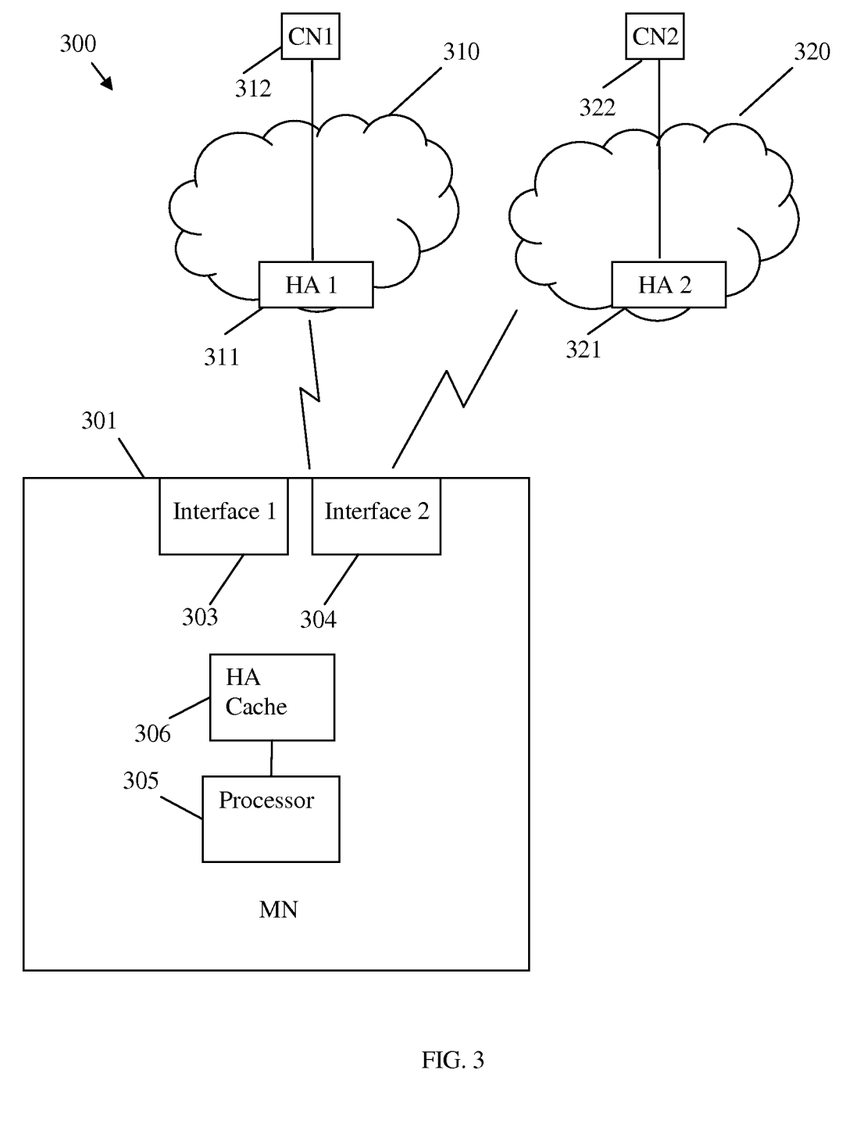
FIG. 3 is a schematic diagram of an embodiment of telecommunications system with a mobile node comprising multiple interfaces.

FIG. 3 is a schematic diagram of an embodiment of telecommunications system 300 with a mobile node comprising multiple interfaces. The system 300 may comprise networks 310 and 320, which may be substantially similar to 110 and 120 respectively. The first network 310 may comprise a first HA 311, and the second network 320 may comprise a second HA 321, both of which may be substantially similar to 111 and 121. The MN 301 may communicate with a first CN 312 and a second CN 322, which may be substantially similar to 112 and 122. The MN 301 may communicate with networks 310 and 320 wirelessly using interfaces 303 and 304. Communications between the MN 301 and network 310 may be managed by a first network node 311 which may comprise a first HA. The first HA may forward communications to the first CN 312 through the network 310. Communications between the MN 301 and network 320 may be managed by a second network node 321 which may comprise a second HA. The second HA 321 may forward communications to the first CN 312 through the network 310.

The system 300 may comprise a MN 301, which may be substantially similar to MN 101, except MN 301 may comprise a plurality of interfaces 303 and 304 for managing multiple communications and/or communication types simultaneously. The interfaces 303 and 304 may be different wireless radio interfaces that enable communications with different wireless networks using different wireless technologies. For example, the interfaces 303 and 304 may comprise radio frequency (RF) transceivers, infrared transceivers, and/or any other wireless communication systems that enable the MN 301 to communicate wirelessly with the networks 310 and 320. At least one of the interfaces 303 and 304 may be initially powered off (e.g. in idle mode) to conserve energy (e.g. battery power) but may be powered on to communicate with the networks 310 and/or 320. In system 300, each interface may be assigned a unique CoA. In this manner, binding by the HAs may be specific to the relevant interface, which may allow flow mobility between interfaces.

The MN 301 may also comprise a general purpose processor 305 for implementing the methods discussed herein. The MN 301 may also comprise a HA cache 306. The MN 301 may receive router advertisements with the address of the HA the MN is currently attached to. The MN may also obtain the HA address using Dynamic Host Configuration Protocol (DHCP). The MN 301 may store each HA address as a HA cache 306 entry. The MN 301 may send periodic binding update messages to each HA listed in the HA cache 306 if any communications sessions are still active that were initiated when the MN 301 was still connected to that HAs network. This process may keep the associated tunnels active. The MN 301 may remove an entry from the HA cache 306 when the associated communication session is terminated or times out due to inactivity. The MN may send a deregistration binding update to the an HA when no communications are active with that HA. The MN 301 may not remove the MNs 301 home HA from the HA cache.

Figure 4:
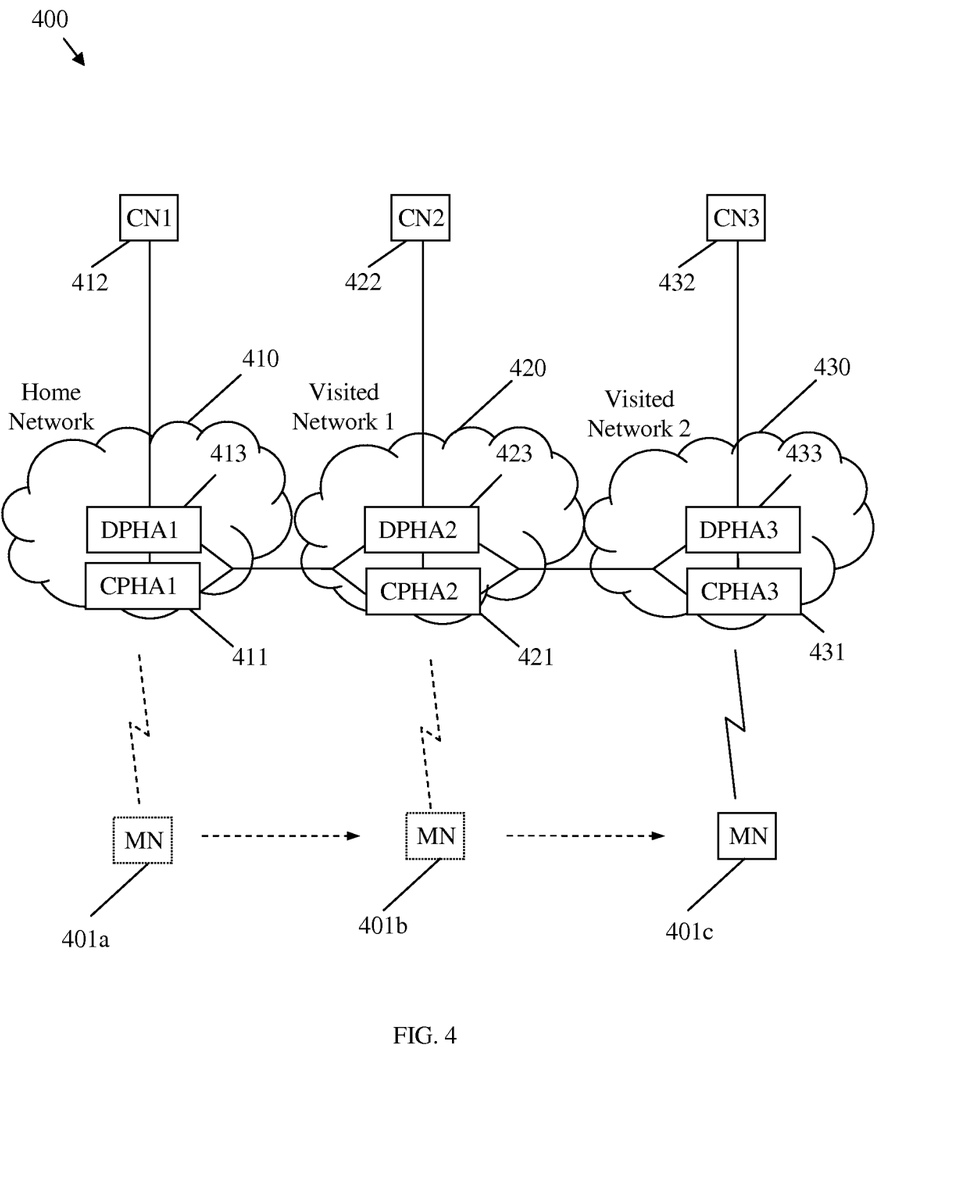
FIG. 4 is a schematic diagram of an embodiment of a multi-home agent telecommunications system with control plane/data plane separation.

FIG. 4 is a schematic diagram of an embodiment of a multi-home agent telecommunications system 400 with control plane/data plane separation. System 400 may be substantially similar to system 100, except that each network 410, 420, and 430, may comprise a control plane HA 411, 421, and 431 and a data plane HA 413, 423, and 433. The MN 401 may connect to the CNs 412, 422, and 432 while keeping control related communications separate from data related communications. The control plane HAs 411, 421, and 431 may manage SAs (e.g. Internet Protocol Security (IPSec) SAs), binding signaling, registration, and address configuration. The data plane HAs 413, 423, and 433 may manage the routing of all data packets between the MN 401 and the CNs 412, 422, and 432. When the MN 301 moves from one network to another, all handover signaling may be handled by the control plane HAs 411, 421, and 431. The control plane HAs 411, 421, and 431 may inform the data plane HAs 413, 423, and 433 of the change, and the data plane HAs 413, 423, and 433 may begin to send data to the MN 401 accordingly. The MN 401 may store the address of the data plane HAs 413, 423, and 433 in the HA cache. Each data plane HA may or may not be located on the same node as the control plane HA in the same network. Each data plane HA may share a database with the control plane HA in the same network. The shared database may comprise a flow binding cache and SA information such as IPSec keys. A data plane HA 413, 423, and/or 433 may comprise a plurality of distributed data plane HAs implemented on a plurality of network nodes in a given network.

Figure 5:
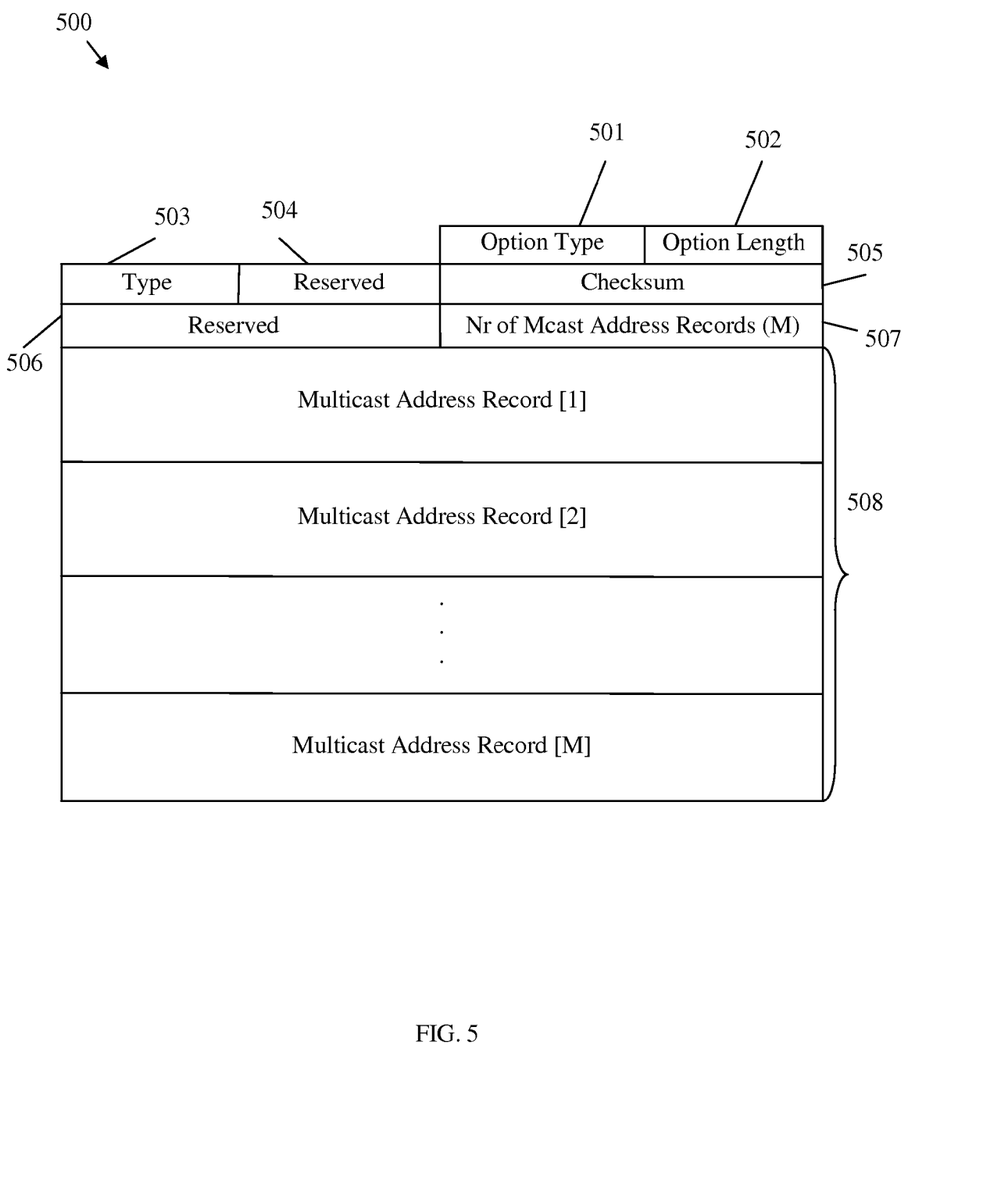
FIG. 5 is a schematic diagram of an embodiment of a multicast state option type length value (TLV) encoding.

FIG. 5 is a schematic diagram of an embodiment of a multicast state option type length value (TLV) 500 encoding. The multicast state option TLV 500 may be included in a binding update sent from a MN to a HA. The HA may use the information in the TLV 500 to act as a Multicast Listener Discovery (MLD) Querier for the MN, and begin serving the MN over an associated network tunnel. The multicast state option TLV 500 may comprise all ongoing multicast group subscriptions of a MN. The TLV 500 may be divided into consecutive 32 bit sections numbered from position zero to position thirty one. The TLV 500 may comprise an option type field 501, which may be eight bits long, may extend from position sixteen to position twenty three and may indicate the encoded data is of type multicast state option. The TLV 500 may comprise an option length field 502, which may be eight bits long, may extend from position twenty four to position thirty one, may comprise an unsigned integer, and may indicate the length of the option excluding the type and length fields. The TLV 500 may comprise a type field 503, which may be eight bits long, extend from position zero to position seven, may comprise an unsigned integer, and may indicate the type of data is a multicast listener report as set forth in IETF document RFC 3810 which is incorporated by reference. The integer in the type field may be set to 143. The TLV 500 may comprise a reserved field 504, which may be eight bits long, may extend from position eight to position fifteen, and may be used for other purposes. The TLV 500 may comprise a checksum field 505, which may be sixteen bits long, may extend from position sixteen to position thirty one, and may comprise data used for error correction purposes. The TLV 500 may comprise another reserved field 506, which may be sixteen bits long, may extend from position zero to position fifteen, and may be used for other purposes. The TLV 500 may comprise a number of Mcast Address Records Field 507, which may be sixteen bits long, may extend from position sixteen to position thirty one, and may comprise data indicating the number of multicast records that are listed in the encoding. The TLV 500 may comprise one or more Multicast address record fields 508, which may be of variable length, may extend from position zero to position thirty one in consecutive 32 bit sections, and may each comprise a separate multicast address record.

Figure 6:
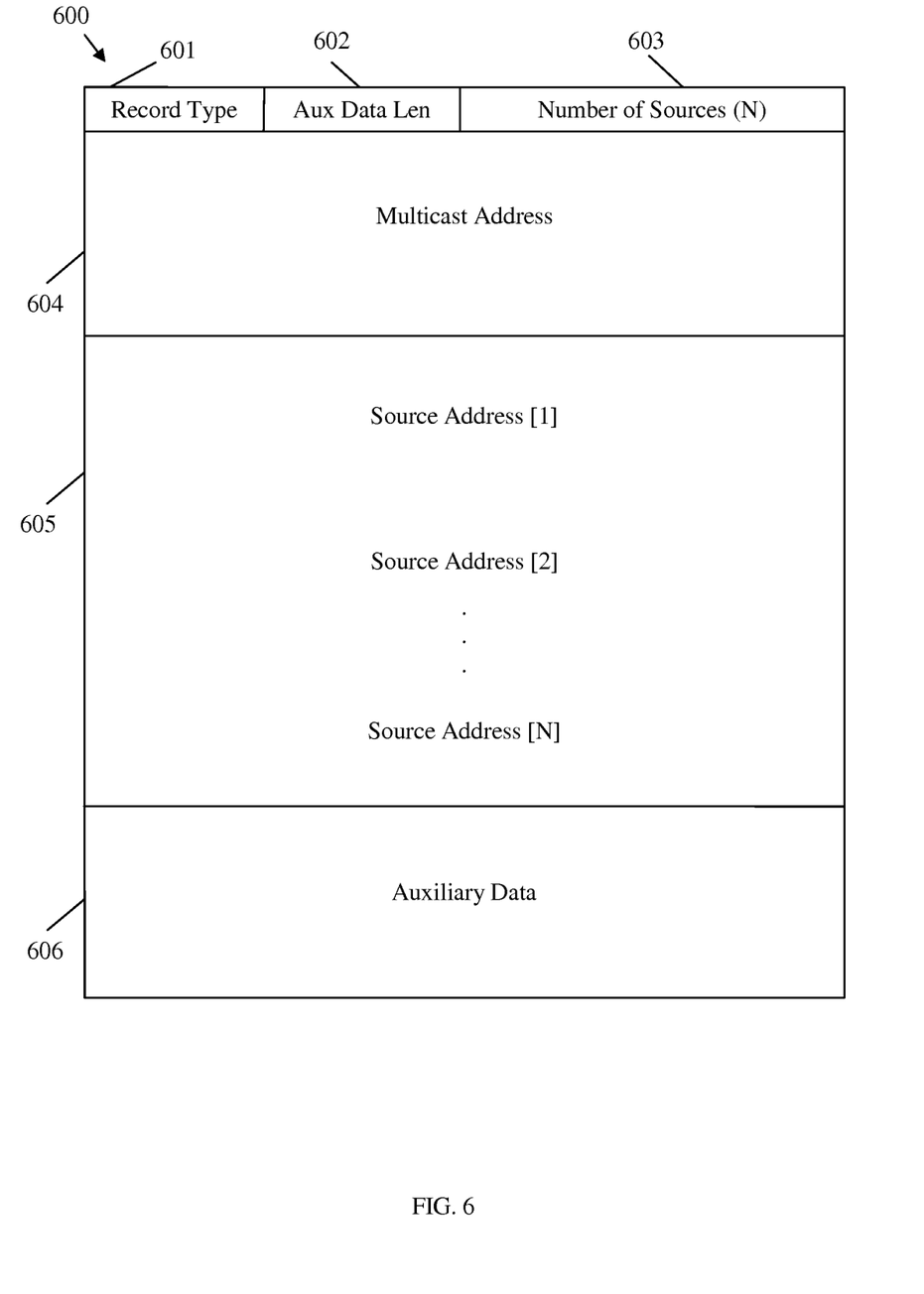
FIG. 6 is a schematic diagram of an embodiment of a multicast state TLV encoding.

FIG. 6 is a schematic diagram of an embodiment of a multicast state TLV 600 encoding. A multicast state TLV 600 may comprise a multicast address record and may be included in a multicast address record field 508 of a multicast state option TLV 500. The TLV 600 may be divided into consecutive 32 bit sections numbered from position zero to position thirty one. The TLV 600 may comprise a Record Type field 601, which may be eight bits long, may extend from position zero to position seven and may indicate the type of multicast record included in the TLV 600. The TLV 600 may comprise an Aux Data Len field 602, which may be eight bits long, may extend from position eight to position fifteen, and may indicate the length of auxiliary data in the TLV 600 in units of 32 bit words. The TLV 600 may comprise a Number of Sources field 603, which may be sixteen bits long, may extend from position sixteen to position thirty one, and may indicate the number of source address fields that are present in the TLV 600. The TLV 600 may comprise a Multicast Address field 604, which may be of variable length, may extend from position one to position thirty one in consecutive 32 bit sections, and may indicate the multicast address to which the TLV 600 pertains. The TLV 600 may comprise one or more Source Address fields 605, which may be of variable length, may extend from position one to position thirty one in consecutive 32 bit sections, and may each indicate a unicast address. The TLV 600 may comprise an Auxiliary Data field 606, which may be of variable length, may extend from position one to position thirty one in consecutive 32 bit sections, and may indicate additional data pertaining to the multicast address record encoded in TLV 600.

Figure 7:
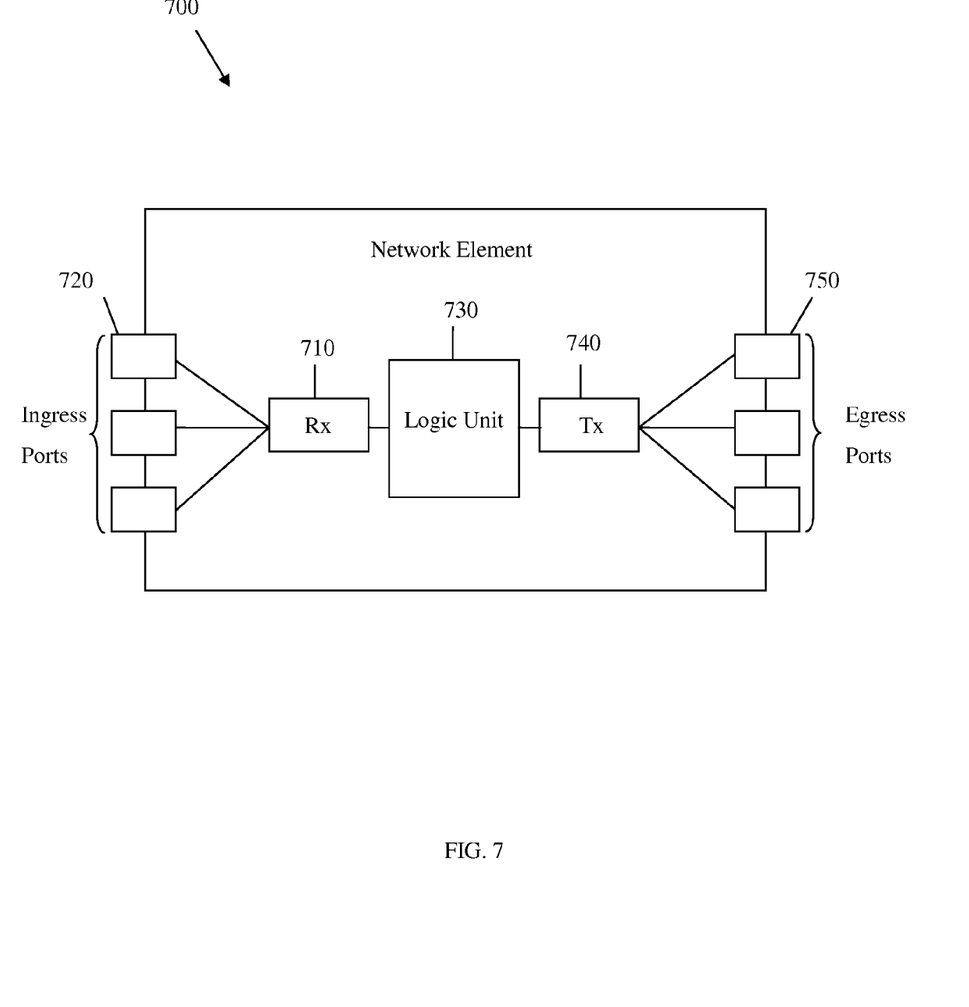
FIG. 7 is a schematic diagram of an embodiment of a general purpose network component.

FIG. 7 is a schematic diagram of an embodiment of a Network Element (NE) 700, which may function as a node in network 100, 300 and/or 400. One skilled in the art will recognize that the term NE encompasses a broad range of devices of which NE 700 is merely an example. NE 700 is included for purposes of clarity of discussion, but is in no way meant to limit the application of the present disclosure to a particular NE embodiment or class of NE embodiments. At least some of the features/methods described in the disclosure may be implemented in a network apparatus or component, such as an NE 700. For instance, the features/methods in the disclosure may be implemented using hardware, firmware, and/or software installed to run on hardware. The NE 700 may be any device that transports frames through a network, e.g., a switch, router, bridge, server, etc. As shown in FIG. 7, the NE 700 may comprise a receiver (Rx) 710 coupled to plurality of ingress ports 720 for receiving frames from other nodes, a logic unit 730 coupled to the receiver to determine which nodes to send the frames to, and a transmitter (Tx) 740 coupled to the logic unit 730 and to plurality of egress ports 750 for transmitting frames to the other nodes. The logic unit 730 may comprise one or more multi-core processors and/or memory devices, which may function as data stores. The ingress ports 720 and/or egress ports 750 may contain electrical and/or optical transmitting and/or receiving components. NE 700 may or may not be a routing component that makes routing decisions.

Figure 8:
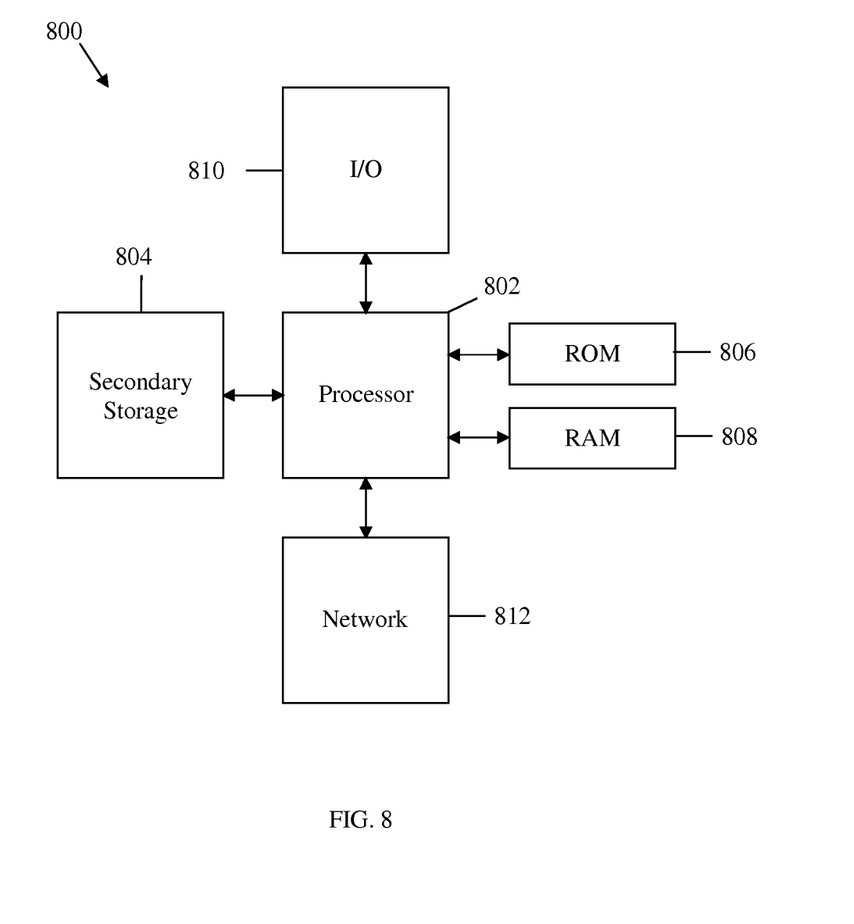
FIG. 8 is a schematic diagram of an embodiment of a general-purpose computer system.

The network components, devices, systems, and methods described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs) and/or digital signal processors (DSPs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means $\pm 10\%$ of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus positioned in a local network comprising: a transmitter; a receiver; and a processor coupled to the transmitter and receiver and configured to cause the apparatus to: negotiate a connection with a mobile node (MN); selectively act as a local home agent (HA) in the local network only for MN flows initiated while the MN is connected to the local network, wherein the local network is not a home network for the MN, wherein acting as a local HA comprises managing control signaling for the MN and not managing data signaling for the MN, and wherein managing control signaling comprises managing binding registrations for the MN; and forward communications regarding MN flows that are not initiated while the MN is connected to the local network to a foreign HA in a foreign network.

2. The apparatus of claim 1, wherein the processor is further configured to cause the apparatus to periodically transmit a message to the MN to cause the MN to maintain a network address of the local HA in a HA cache.

3. The apparatus of claim 2, wherein the periodic transmission is employed to prevent expiration, after a timeout period, of a HA cache entry associated with the local HA address.

4. The apparatus of claim 1, wherein the processor is further configured to cause the apparatus to:
provide the MN with a Care of Address (CoA) associated with the local network;
send a binding update message to the foreign HA on behalf of the MN, wherein the binding update message comprises the CoA; and
register the CoA with a domain name system (DNS) on behalf of the MN.

5. The apparatus of claim 1, wherein acting as a local HA for the MN flows comprises acting as a local HA for flows associated with a first interface of a plurality of interfaces associated with the MN.

6. The apparatus of claim 5, wherein a Care of Address (CoA) assigned to the first interface is a different address than each CoA assigned to the other interfaces.

7. A method implemented in a local network node in a local network comprising: negotiating a connection with a mobile node (MN);
selectively acting as a local home agent (HA) in the local network only for MN flows initiated while the MN is connected to the local network, wherein the local network is not a home network for the MN, wherein acting as the local HA comprises managing control signaling for the MN and not managing data signaling for the MN, and wherein managing control signaling comprises managing binding registrations for the MN; receiving a binding update message from the MN, wherein the binding update message comprises a multicast listener state of the MN related to an MN flow initiated via the local network; and acting as a Multicast Listener Discovery (MLD) Querier for the MN using the multicast listener state from the binding update message.

8. The method of claim 7, wherein the MN multicast state includes information regarding an interface between the MN and a foreign HA in a foreign network.

9. The method of claim 8 further comprising creating a data tunnel with the MN via the foreign network by employing the MN's multicast state.

10. The method of claim 7, wherein the binding update message is encoded in a type length value (TLV) packet comprising:
an option type field that indicates the TLV option is a multicast state option,
an option length field that indicates the length of the option, and
one or more multicast address record fields that indicate the multicast address records that make up the MNs multicast state.

11. The method of claim 7, wherein the local network node is an Internet Protocol version six (IPv6)/Internet Protocol version four (IPv4) dual stack device.

12. A method implemented in a local control plane node in a local network comprising:
negotiating a connection with a mobile node (MN);
selectively acting as a local control plane home agent (CPHA) in the local network only for MN flows initiated while the MN is connected to the local network, wherein the local network is not a home network for the MN, wherein acting as a local CPHA comprises managing control signaling for the MN and not managing data signaling for the MN, and wherein managing control signaling comprises managing binding registrations for the MN;
causing a local data plane node positioned in the local network to selectively act as a data plane home agent (DPHA) for the MN by managing data signaling only for MN flows initiated while the MN is connected to the local network; and
forwarding control communications regarding MN flows that are not initiated while the MN is connected to the local network to a foreign home agent (HA) in a foreign network.

13. The method of claim 12, wherein the CPHA shares a common database with the DPHA, and wherein the CPHA is hosted on a separate physical entity from the DPHA.

14. The method of claim 12, wherein the CPHA is configured to receive a binding update from the MN and send a binding acknowledgement to the MN, and wherein an address of the DPHA is included in the binding acknowledgement.

15. A method comprising: sending, by a home agent capable access router (HA), router advertisements (RAs) with a home agent information option, wherein the HA selectively acts as a local HA in a local network only for mobile node (MN) flows initiated while the MN is connected to the local network, wherein the local network is not a home network for the MN, wherein acting as a local HA comprises managing control signaling for the MN and not managing data signaling for the MN, and wherein managing control signaling comprises managing binding registrations for the MN; caching, by the mobile node (MN), the HA address when the MN receives the RA; moving, by the MN, to a second link and using a second HA; getting, by the MN, a new Care of Address (CoA) on the second link; sending, by the MN, a binding update message to the first HA on a first link to register the CoA with the first HA; and receiving, by the MN, a binding acknowledgement from the first HA, wherein the MN does not establish any bindings with the first HA until it moves to the second link and still has active sessions initiated on the first link.

16. The method of claim 15, wherein the MN uses the CoA as its new home address and registers the CoA with a domain name system (DNS).

17. The method of claim 15, wherein the MN obtains a local address for each HA when the MN is connected to that HA, wherein the MN keeps a cache of HA addresses and uses the cache to keep track of the HAs with which the MN is currently registered, wherein the MN stores the local addresses in the cache, wherein the MN sends periodic binding update messages to each HA in the HA cache using the local addresses to keep HA-MN tunnels active, and wherein the MN uses the local addresses as the source addresses for reverse tunneled packets sent to correspondent nodes (CNs).

18. The method of claim 15, wherein the MN comprises multiple interfaces and has a home HA, wherein the MN obtains a unique CoA for each interface, wherein the MN registers the CoAs with the home HA if the MN is not connected to a home link, and uses the CoAs to communicate with the home HA over the interfaces, wherein the MN does not register multiple CoAs with the home HA if the MN is connected to the home link, and wherein multiple CoA registration allows for flow mobility between interfaces of a mobile node.

19. The method of claim 15, wherein the method is implemented on a network that employs control and data plane separation for distributed mobility management, wherein the control plane is used for registration and handover signaling, and wherein the data plane is used for data transfer from corresponding nodes (CNs) to the MN and from the MN to the CNs.

* * * * *